(12) United States Patent
Jeong et al.

(10) Patent No.: US 7,667,426 B2
(45) Date of Patent: Feb. 23, 2010

(54) ON-LINE MINIMUM COPPER LOSS CONTROL OF INTERIOR PERMANENT-MAGNET SYNCHRONOUS MACHINE FOR AUTOMOTIVE APPLICATIONS

(75) Inventors: Yu-Seok Jeong, Seoul (KR); Seung Ki Sul, Seoul (KR); Silva Hiti, Redondo Beach, CA (US); Khwaja M. Rahman, Troy, MI (US); Bon-Ho Bae, Torrance, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 967 days.

(21) Appl. No.: 11/156,019

(22) Filed: Jun. 17, 2005

(65) Prior Publication Data
US 2006/0284582 A1    Dec. 21, 2006

(51) Int. Cl.
*H02P 6/00* (2006.01)
*H02P 6/06* (2006.01)

(52) U.S. Cl. .................. 318/700; 318/400.07; 318/798; 318/806

(58) Field of Classification Search ................ 318/700, 318/400.01, 400.02, 400.04, 400.07, 705, 318/798, 801, 806
See application file for complete search history.

(56) References Cited

U.S. PATENT DOCUMENTS

| | | | | |
|---|---|---|---|---|
| 6,163,128 A * | 12/2000 | Hiti et al. | | 318/722 |
| 6,239,575 B1 * | 5/2001 | Xu et al. | | 318/801 |
| 6,304,052 B1 * | 10/2001 | O'Meara et al. | | 318/700 |
| 6,349,796 B1 * | 2/2002 | Tauchi et al. | | 318/254 |
| 6,429,620 B2 * | 8/2002 | Nakazawa | | 318/701 |
| 6,593,714 B2 * | 7/2003 | Nagayama | | 318/254 |
| 6,639,380 B2 * | 10/2003 | Sul et al. | | 318/727 |
| 6,700,400 B2 * | 3/2004 | Atarashi | | 318/254 |
| 6,727,669 B2 * | 4/2004 | Suzuki et al. | | 318/139 |
| 6,777,897 B2 * | 8/2004 | Murai | | 318/138 |
| 6,815,924 B1 * | 11/2004 | Iura et al. | | 318/727 |
| 6,850,033 B1 * | 2/2005 | Gallegos-Lopez et al. | | 318/807 |
| 6,936,991 B2 * | 8/2005 | Chen et al. | | 318/700 |
| 6,984,957 B2 * | 1/2006 | Tajima et al. | | 318/700 |
| 7,005,828 B2 * | 2/2006 | Karikomi | | 318/801 |
| 2005/0285556 A1 * | 12/2005 | Chen et al. | | 318/432 |

(Continued)

OTHER PUBLICATIONS

B. J. Chalmers, L. Musaba, and D. F. Gosden, "Variable-Frequency Synchronous Motor Drives for Electric Vehicles," *IEEE Trans. Industry Applications*, vol. 32, No. 4, pp. 896-903, Jul./Aug. 1996.

(Continued)

*Primary Examiner*—Walter Benson
*Assistant Examiner*—Eduardo Colon (57) ABSTRACT

A system and method for controlling an IPM synchronous machine in a vehicle that calculates an operating trajectory of the machine on-line. The system defines three operating ranges of the machine based on voltage magnitude, where a first operating range is controlled by a current limit of the machine and second and third operating regions are controlled by a voltage limit of the machine. The system calculates d- and q-axis current reference signals in the reference rotor frame for each of the three regions. The system determines which set of current reference signals will be used to control the machine based on the operating region. The third operating region is used during over-modulation of the machine.

21 Claims, 3 Drawing Sheets

U.S. PATENT DOCUMENTS

2006/0022626 A1*  2/2006  Kobayashi et al. .......... 318/432
2006/0049792 A1*  3/2006  Chen et al. ................. 318/716

OTHER PUBLICATIONS

N. Bianchi and S. Bolognani, "Parameters and Volt-Ampere Rating of a Synchronous Motor Drive for Flux-Weakening Applications," *IEEE Trans. Power Electronics*, vol. 12, No. 5, pp. 895-903, Sep. 1997.

C. Mademlis and V. G. Agelidis, "On Considering Magnetic Saturation with Maximum Torque to Current Control in Interior Permanent Magnet Synchronous Motor Drives," *IEEE Trans. Energy Conversion*, vol. 16, No. 3, pp. 246-252, Sep. 2001.

On-line Minimum-Copper-Loss Control of an Interior Permanent-Magnet Synchronous Machine for Automotive Applications.

* cited by examiner

ON-LINE MINIMUM COPPER LOSS CONTROL OF INTERIOR PERMANENT-MAGNET SYNCHRONOUS MACHINE FOR AUTOMOTIVE APPLICATIONS

BACKGROUND OF THE INVENTION

1. Field of the Invention

This invention relates generally to a system for controlling a permanent magnet machine and, more particularly, to a system for providing real time current reference signals in the d- and q-axis for controlling the torque output of an interior permanent-magnet (IPM) synchronous machine that minimize the copper loss, where the system considers the inherent and non-linear magnetic saturation effects of the machine.

2. Discussion of the Related Art

IPM synchronous machines have become popular for certain automotive applications as a result of their high efficiency and extended speed range. These applications include use of the machines as an integrated starter/alternator in internal combustion engine vehicles and/or a traction motor in electric vehicles and hybrid vehicles. The IPM synchronous machine is a three-phase AC machine that includes three coils in the machine stator and a permanent magnet in the machine rotor. The stator coils receive three phase current command signals transformed from the d- and q-axis current command signals that are 90° out of phase with each other that control the torque and speed of the machine. For a particular torque command from the vehicle operator, the current command signals are selected to provide minimum copper loss for that torque. Further, the appropriate current command signals generate the maximum torque from the machine for certain operating conditions.

During vehicle operation, the current command signals applied to the IPM synchronous machine for a particular commanded torque or for a maximum torque have heretofore been provided from look-up tables. The look-up tables are generated from operating an equivalent machine on a dynamometer off-line under the various vehicle operating conditions, and storing the command signals that provide the best efficiency for a commanded torque. Generally, the current command signals are stored in the look-up table as d- and q-axis current reference values in the rotor reference frame, as is well understood in the art.

The look-up tables may provide the proper current command signals for laboratory conditions. However, the operating parameters of a vehicle change in response to temperature changes, vehicle aging, etc. Therefore, the look-up table values may not provide the optimum machine efficiency for a particular commanded torque during normal operation of the vehicle. It is therefore desirable to provide a technique for determining the current command signals applied to the IPM machine in real-time for the particular operating conditions of the vehicle.

SUMMARY OF THE INVENTION

In accordance with the teachings of the present invention, a system and method for controlling an IPM synchronous machine in a vehicle are disclosed that calculate an operating trajectory of the machine on-line. The system defines three operating ranges of the machine based on vehicle speed, where a first operating range is controlled by a current limit of the machine and second and third operating regions are controlled by a voltage limit of the machine. The system calculates two current reference signals for the d- and q-axis in the rotor reference frame for each of the three regions. The system determines which set of current reference signals will be used to control the machine based on which operating region the vehicle is in. The third operating region is used during over-modulation of the machine.

Additional advantages and features of the present invention will become apparent from the following description and appended claims, taken in conjunction with the accompanying drawings.

DETAILED DESCRIPTION OF THE EMBODIMENTS

The following discussion of the embodiments of the invention directed to a system and method for controlling an IPM synchronous machine is merely exemplary in nature, and is in no way intended to limit the invention or its applications or uses.

According to the invention, a system and control algorithm for controlling an IPM synchronous machine is disclosed that calculates the optimal operating trajectory of the machine on-line, instead of using stored look-up tables obtained through off-line motor characterization processes. The algorithm calculates d- and q-axis current reference signals on-line in the entire operating range that define the control signals for the machine, where the inherent non-linear magnetic saturation effect of the IPM machine is considered. The amplitude of the current vector is minimized to produce a required torque, which is intended to minimize copper loss. The algorithm approaches the minimum copper loss operation as a non-linearly constrained optimization, where the torque condition is the equality constraint and the inverter capacity, i.e., the current and voltage magnitude gives two inequality constraints. This gives two sets of non-linear equations depending on the vehicle operating region.

Figure 1:
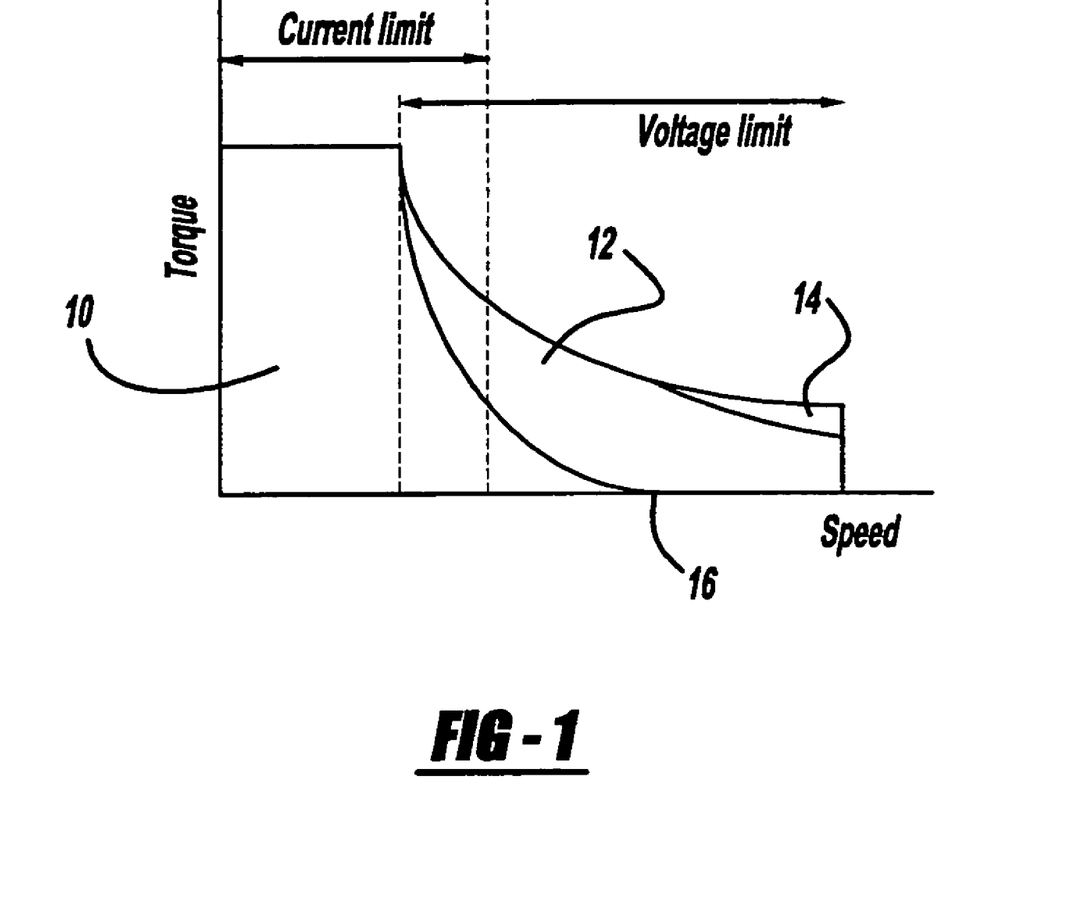
FIG. 1 a graph with vehicle speed on the horizontal axis and torque on the vertical axis showing the operating ranges of a vehicle employing an IPM synchronous machine.

FIG. 1 is a graph with vehicle speed on the horizontal axis and motor torque on the vertical axis showing the operating range of an IPM synchronous machine in a vehicle. The graph includes three operating regions 10, 12 and 14, and defines a maximum current limit and a voltage limit, discussed below, based on vehicle speed. As will be further discussed below, the region 10 is a minimum current operating region that produces a torque error equation and a gradient error equation describing the error between the gradient of the torque curve and that of the current circle at the machine operating point in the rotor reference frame. The regions 12 and 14 are maximum voltage operation regions that produce the torque error equation and a voltage error equation describing the error between the rated voltage and the operating voltage in the rotor reference frame.

The machine system includes an inverter that inverts a DC voltage from a suitable power source, such as a battery or a fuel cell module, to an AC voltage controlling the stator currents of the machine to provide the desired output torque. The inverter includes semiconductor switches that have a maximum current that they are able to withstand before they are damaged. Therefore, it is necessary not to exceed that maximum current limit when providing the current command signals for the operating conditions of the machine. Further, the power source is only able to provide a certain maximum voltage. Therefore, the current command signals that control the machine will be limited both by a current limit and a voltage limit. Particularly, at low speeds, the voltage available from the power source is enough to provide the desired torque, and therefore the machine can be controlled based on the current limit. As the speed of the machine increases for higher torque demands, the ability of the power source to provide the necessary voltage to sustain the torque controls how much torque the machine can produce, without being concerned about the current limit of the switches.

As will be discussed in further detail below, a current reference signal for the d-axis and a current reference signal for the q-axis are calculated differently depending on which region 10, 12 or 14 the machine is operating in. Therefore, the control algorithm of the invention determines what region 10, 12 or 14 the IPM synchronous machine is currently operating in, so that it knows what equations to use to calculate the d- and q-axis current reference signals that define the three-phase currents applied to the stator of the machine.

The state or voltage model of an IPM synchronous machine in the rotor reference frame can be expressed as:

$$v_{dq}^r = R_s i_{dq}^r + \frac{d}{dt}\lambda_{dq}^r + j\omega_r \lambda_{dq}^r \tag{1}$$

where $\lambda_{dq}^r = f(i_{dq}^r, \Lambda_m)$ and $\Lambda_m$ define the rotor magnet flux linkage.

The machine's static and dynamic inductances can be defined as:

$$L_{ds} = \frac{\lambda_d^r - \Lambda_m}{i_d^r}, \tag{2}$$

$$L_{qs} = \frac{\lambda_q^r}{i_q^r},$$

$$L_{dd} = \frac{\partial \lambda_d^r}{\partial i_d^r},$$

$$L_{qq} = \frac{\partial \lambda_q^r}{\partial i_q^r}$$

The electromagnetic torque $\tau_e$ with P poles is defined as:

$$\tau_e = \frac{3P}{4}(\lambda_d^r i_q^r - \lambda_q^r i_d^r) = \frac{3P}{4}[\Lambda_m + (L_{ds} - L_{qs})i_d^r]i_q^r \tag{3}$$

The minimum copper loss control can be interpreted as a non-linearly constrained optimization as:

$$\min_{i_{dq}^r} |i_{dq}^r|^2 \tag{4}$$

for $$i_{dq}^r \in \left\{ i_{dq}^r | \tau_e^* = \frac{3P}{4}(\lambda_d^r i_q^r - \lambda_q^r i_d^r), |v_{dq}^r| \leq \frac{V_{dc}}{\sqrt{3}} \right\}$$

The voltage constraint gives an elliptical bound in the d-q current plane.

Assuming that there are two non-linear functions $f(i_d^r, i_q^r)$ and $g(i_d^r, i_q^r)$, the solution $(i_d^{r*}, i_q^{r*})$ for $f=g=0$ can be determined by a numerical method:

$$\begin{bmatrix} i_d^{r*} \\ i_q^{r*} \end{bmatrix} = \begin{bmatrix} i_d^r \\ i_q^r \end{bmatrix} - \begin{bmatrix} D_d f & D_q f \\ D_d g & D_q g \end{bmatrix}^{-1} \begin{bmatrix} f(i_d^r, i_q^r) \\ g(i_d^r, i_q^r) \end{bmatrix} \tag{5}$$

For the secant method, the directional matrix in equation (5) becomes:

$$\begin{bmatrix} D_d f & D_q f \\ D_d g & D_q g \end{bmatrix} = \begin{bmatrix} \frac{f(i_d^r, i_q^r) - f(0, i_q^r)}{i_d^r} & \frac{f(i_d^r, i_q^r) - f(i_d^r, 0)}{i_q^r} \\ \frac{g(i_d^r, i_q^r) - g(0, i_q^r)}{i_d^r} & \frac{g(i_d^r, i_q^r) - g(i_d^r, 0)}{i_q^r} \end{bmatrix} \tag{6}$$

For the Newton's method, the directional matrix in equation (5) becomes:

$$\begin{bmatrix} D_d f & D_q f \\ D_d g & D_q g \end{bmatrix} = \begin{bmatrix} \frac{\partial f(i_d^r, i_q^r)}{\partial i_d^r} & \frac{\partial f(i_d^r, i_q^r)}{\partial i_q^r} \\ \frac{\partial g(i_d^r, i_q^r)}{\partial i_d^r} & \frac{\partial g(i_d^r, i_q^r)}{\partial i_q^r} \end{bmatrix} \tag{7}$$

The non-linear system for the constrained optimization in the region 10 can be expressed by equations (8) and (9) below, neglecting the cross-coupling affect, and assuming that the d- and q-axis flux linkages are functions of the corresponding axis current only.

$$f = \frac{4}{3P}(\tau_e^* - \tau_e) \tag{8}$$

$$= \lambda_q^r i_d^r - \lambda_d^r i_q^r + \frac{4\tau_e^*}{3P}$$

-continued $$g = \frac{2}{3P}\left(\frac{\partial |i_{dq}^r|^2}{\partial i_d^r} \cdot \frac{\partial \tau_e}{\partial i_q^r} - \frac{\partial |i_{dq}^r|^2}{\partial i_q^r} \cdot \frac{\partial \tau_e}{\partial i_d^r}\right) \quad (9)$$
$$= i_d^r(\lambda_d^r - L_{qq}i_d^r) - i_q^r(L_{dd}i_q^r - \lambda_q^r)$$

Equation (9) comes from the gradient condition which means that the tangent slope of both the torque curve and the current circle at the operating point should be equal. It should be noted that the coefficients are not the static inductances, but the dynamic inductances.

Based on the calculations above, the current reference signals $i_d^{r*}$ and $i_q^{r*}$ at low vehicle speeds in the minimum current operation region 10 are approximately calculated by the secant method in equation (10) and the Newton's method in equation (11), respectively:

$$\begin{bmatrix} i_d^{r*} \\ i_q^{r*} \end{bmatrix} \approx \begin{bmatrix} i_d^r \\ i_q^r \end{bmatrix} - \begin{bmatrix} \lambda_q^r & -\lambda_d^r \\ \lambda_d^r & \lambda_q^r \end{bmatrix}^{-1} \begin{bmatrix} f(i_d^r, i_q^r) \\ g(i_d^r, i_q^r) \end{bmatrix} \quad (10)$$

$$\begin{bmatrix} i_d^{r*} \\ i_q^{r*} \end{bmatrix} \approx \begin{bmatrix} i_d^r \\ i_q^r \end{bmatrix} - \quad (11)$$
$$\begin{bmatrix} \lambda_q^r - L_{dd}i_q^r & -\lambda_d^r + L_{qq}i_d^r \\ \lambda_d^r + (L_{dd} - 2L_{qq})i_d^r & \lambda_q^r + (L_{qq} - 2L_{dd})i_q^r \end{bmatrix}^{-1} \begin{bmatrix} f(i_d^r, i_q^r) \\ g(i_d^r, i_q^r) \end{bmatrix}$$

In the Newton's method, the partial derivative of the dynamic inductance, which is the second derivative of the flux linkage with respect to the corresponding axis current, can be neglected for the simplicity of calculation.

As the speed of the machine increases into the region 12, so does the amplitude of the voltage vector. At high vehicle speeds, the minimum copper loss control should consider the voltage condition.

$$f = \frac{4}{3P}(\tau_e^* - \tau_e) = \lambda_q^r i_d^r - \lambda_d^r i_q^r + \frac{4\tau_e^*}{3P} \quad (12)$$

$$g = \frac{1}{2}\left(|v_{dq}^r|^2 - \frac{V_{dc}^2}{3}\right) = \frac{1}{2}(R_s i_d^r - \omega_r \lambda_q^r)^2 + \frac{1}{2}(R_s i_q^r + \omega_r \lambda_d^r)^2 - \frac{V_{dc}^2}{6} \quad (13)$$

Equation (13) is derived from the voltage model in the steady state. Due to the effect of the stator resistance, the solutions of equation (14) below are not exactly symmetric to the d-axis when the IPM synchronous machine operates as a motor or as a generator. The current reference signals $i_d^{r*}$ and $i_q^{r*}$ in the maximum voltage operation region 12 are approximately calculated by the secant method from equation (14) and the Newton's method from equation (15), respectively, by:

$$\begin{bmatrix} i_d^{r*} \\ i_q^{r*} \end{bmatrix} \approx \begin{bmatrix} i_d^r \\ i_q^r \end{bmatrix} - \begin{bmatrix} \lambda_q^r & -\lambda_d^r \\ \omega_r^2 L_{ds}\lambda_d^r & \omega_r^2 L_{qs}\lambda_q^r \end{bmatrix}^{-1} \begin{bmatrix} f(i_d^r, i_q^r) \\ g(i_d^r, i_q^r) \end{bmatrix} \quad (14)$$

$$\begin{bmatrix} i_d^{r*} \\ i_q^{r*} \end{bmatrix} \approx \begin{bmatrix} i_d^r \\ i_q^r \end{bmatrix} - \begin{bmatrix} \lambda_q^r - L_{dd}i_q^r & -\lambda_d^r + L_{qq} \cdot i_d^r \\ \omega_r^2 L_{dd}\lambda_d^r - \omega_r R_s(\lambda_q^r - L_{dd}i_q^r) & \omega_r^2 L_{qq}\lambda_q^r + \omega_r R_s(\lambda_d^r - L_{qq}i_d^r) \end{bmatrix}^{-1} \begin{bmatrix} f(i_d^r, i_q^r) \\ g(i_d^r, i_q^r) \end{bmatrix} \quad (15)$$

In the Newton's method, the square of the stator resistance can be neglected for the simplicity of calculation.

If the torque reference is beyond its maximum limit with the linear voltage range, the over-modulation operation of the machine is required to meet the torque reference and the current reference for the maximum torque operation, which can be approximately calculated by expanding the voltage limit gradually from the linear limit $V_{dc}/\sqrt{3}$ to the six-step limit $2V_{dc}/\pi$. However, the current reference signals under a constant torque reference may not be constant, which is not desirable. Therefore, the following equations (16)-(18) are used to fix the current reference signals under a constant torque reference and the over-modulation operation for the operating region 14.

$$I_d^r = -\frac{\Lambda_m}{L_{ds}} - \frac{V_{dc}}{2\sqrt{3}|\omega_r|}, I_q^r \quad (16)$$
$$= \frac{R_s I_d}{\omega_r L_{qs}} + sgn(\tau_e^*)\sqrt{\frac{V_{dc}}{3\omega_r^2} - (L_{ds}I_d^r + \Lambda_m)^2}$$

$$T_e = \frac{3P}{4}\{\Lambda_m + (L_{ds} - L_{qs})I_d^r\}I_q^r \quad (17)$$

$$\begin{bmatrix} i_d^{r*} \\ i_q^{r*} \end{bmatrix} = \quad (18)$$
$$\begin{bmatrix} L_{ds} & 0 \\ 0 & L_{qs} \end{bmatrix}^{-1} \left\{ \begin{bmatrix} \frac{\tau_e^{*2}}{T_e^2} & 0 \\ 0 & \frac{\tau_e^*}{T_e} \end{bmatrix} \left( \begin{bmatrix} L_{ds} & 0 \\ 0 & L_{qs} \end{bmatrix} \begin{bmatrix} i_d^r \\ i_q^r \end{bmatrix} + \begin{bmatrix} \Lambda_m \\ 0 \end{bmatrix} \right) - \begin{bmatrix} \Lambda_m \\ 0 \end{bmatrix} \right\}$$

The point $(I_d^r, I_q^r)$ is around the point calculated by equation (14) or (15) at the maximum torque with linear voltage range. According to the graphical interpretation of equation (16), the current reference lies on a parabola whose vertex is the center of the voltage ellipse.

The current references calculated by equation (10) or (11) in the region 10, equation (14) or (15) in the region 12 and equation (18) in the region 14 should be limited to its maximum value. If it exceeds its maximum value, the torque error calculated by equations (8) and (12) is limited to not be positive, and the current reference is modified to have the magnitude of its maximum:

$$\begin{bmatrix} i_d^{r} \\ i_q^{r} \end{bmatrix} = sat\left(\frac{I_{max}}{\sqrt{i_d^{r*2} + i_p^{r*2}}}\right)\begin{bmatrix} i_d^{r*} \\ i_q^{r*} \end{bmatrix} \quad (19)$$

The values $V_{dc}$ and $i_d^r, i_q^r$ are the measured dc link voltage and the d- and q-axis current in the rotor reference frame transformed from the measured phase currents of the machine. Equations (10) and (14) by the secant method or equations (11) and (15) by the Newton's method, and equation (18) determine the d- and q-axis current reference signals $i_d^{r*}$ and $i_q^{r*}$ in the rotor reference frame for the regions 10, 12 and 14, respectively. These current reference signals $i_d^{r*}$ and $i_q^{r*}$ are then used to determine the three a, b and c current signals applied to the three coils in the stator of the machine to control the output torque of the machine in a manner that is well understood in the art. Equations (10), (11), (14), (15) and (18) consider the saturation of the synchronous machine, which can then provide the optimal current commands.

Figure 2:
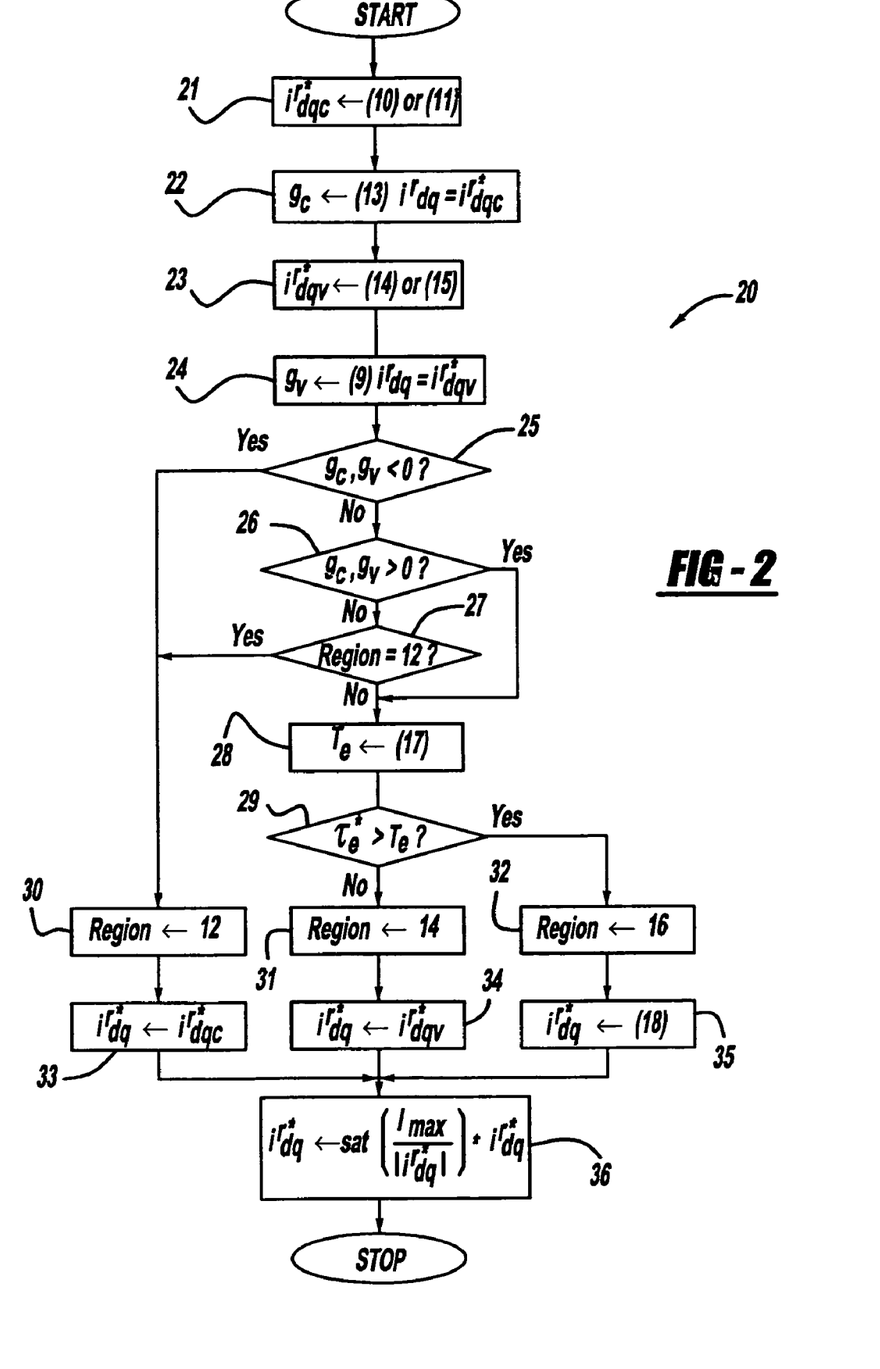
FIG. 2 is a flow chart diagram for an algorithm that generates the current reference signals used to control an IPM synchronous machine, according to an embodiment of the present invention.

FIG. 2 is a flow chart diagram 20 showing the operation of determining and using the current reference signals $i_d^{r*}$ and $i_q^{r*}$ for the machine depending on the operating conditions. Equations (10) and (14) are used in blocks 21 and 23 if the secant method is chosen. If the Newton's method is chosen, then equations (11) and (15) are used in blocks 21 and 23. In the over-modulation region, equation (18) determines the d- and q-axis current reference signals $i_d^{r*}$ and $i_q^{r*}$ in the rotor reference frame. The algorithm identifies the operating region among the regions 10, 12, and 14 based on the voltage condition at box 22 and the gradient condition at box 24. At decision diamond 25, the algorithm determines whether both of the voltage error and the gradient error are negative. If this condition is met, then the algorithm knows that the vehicle speed is low enough at box 30 for region 12 where only the current limit is active, and therefore the current reference calculated by equation (10) by the secant method or equation (11) by the Newton's method is selected at box 33.

If the condition is not met at the decision diamond 25, then the algorithm determines whether both of the voltage error and the gradient error are positive at decision diamond 26. If this condition is met, then the algorithm knows that the vehicle speed is high enough where the voltage limit controls, and determines whether the torque reference is higher than the maximum available torque using the linear voltage limit at decision diamond 29. The algorithm calculates $\tau_e$ by equation (17) at box 28. If the condition is not met at the decision diamond 26, then the algorithm goes to the box 33 if the machine is in the region 12 at decision diamond 27. If the condition is not met at the decision diamond 29, the current reference calculated in equation (14) by the secant method or equation (15) by the Newton's method is selected at box 34 for region 14 at box 31. Otherwise the algorithm uses the current reference signal from equation (18) at box 35 for region 16 at box 32. Finally the current reference is limited to its maximum value at box 36.

Figure 3:
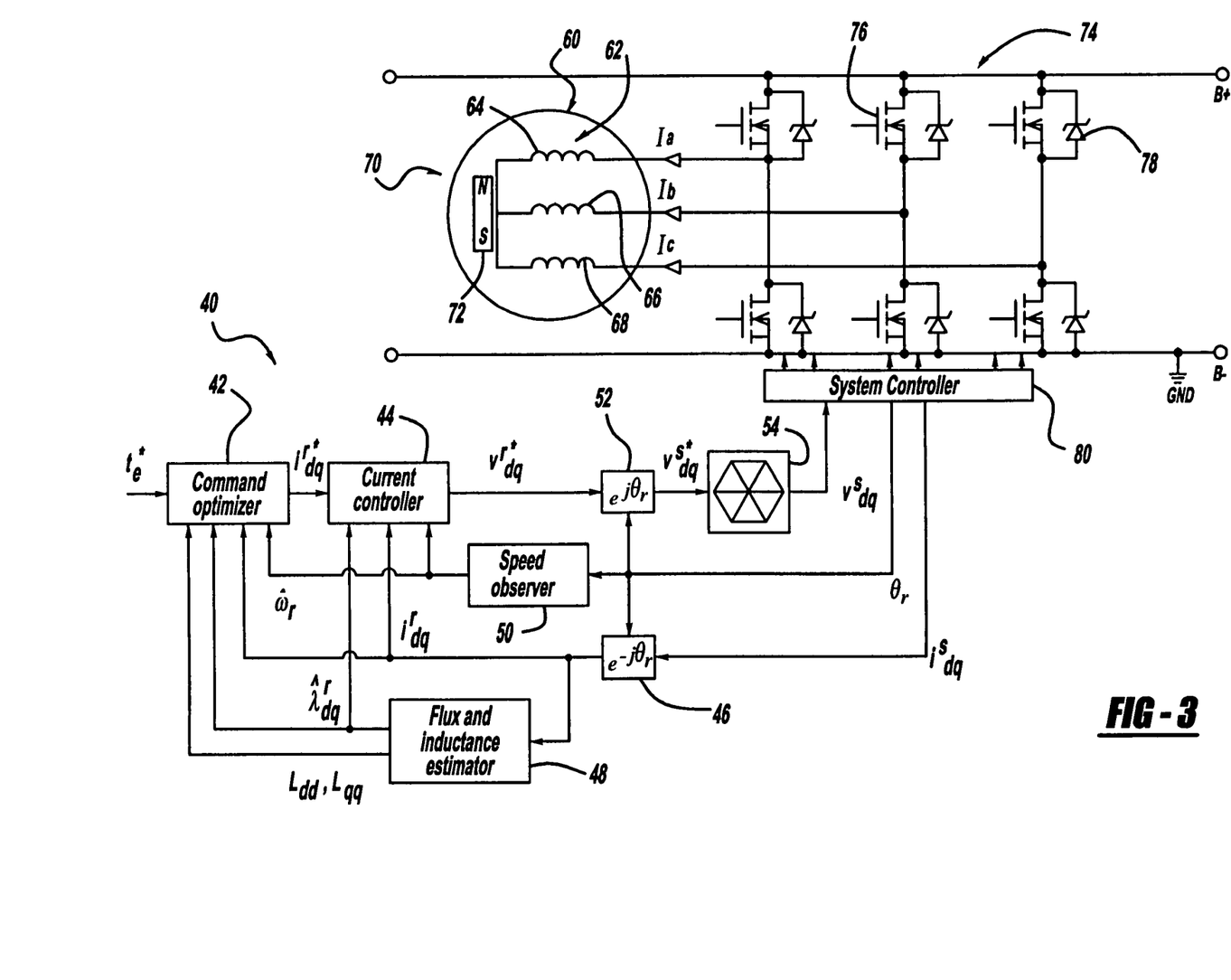
FIG. 3 is a schematic block diagram of a control system for controlling an IPM synchronous machine, according to an embodiment of the present invention.

FIG. 3 is a block diagram of a control system 40 for controlling the current command signals applied to an IPM synchronous machine 60. The machine 60 includes a stator 62 including three stator coils 64, 66 and 68. The machine 60 also includes a rotor 70 including a permanent magnet 72. An inverter 74 inverts the DC voltage from a DC power source, such as a battery. The inverter 74 includes six MOSFET switches 76 and six diodes 78 to provide the conversion for the three current signals a, b and c applied to the coils 64, 66 and 68. An I/O interface 80 receives gating signals calculated by space vector pulse width modulation using $v_{dq}^s$, discussed below, from the control system 40, and controls the switches 76 to provide the current signals applied to the coils 64, 66 and 68. Also, the I/O interface 90 provides a rotor position signal $\theta_r$ of the measured rotor position and a current signal $i_{dq}^s$ transformed from the measured current of the coils 64, 66 and 68.

The control system 40 includes a command optimizer 42 that calculates equation (10) or (14) in region 12, equation (11) or (15) in region 14, and equation (18) in region 16, and determines which one of the current reference signals in the d- and q-axis of the rotor reference frame will be used consistent with the discussion above. It should be noted that a low pass filter (not shown) is used to suppress the noise from the measured current signal $i_{dq}^s$ for the approximation of the first derivative of the flux linkage using the divided difference. The current reference signals $i_q^{r*}$ from the command optimizer 42 is sent to a current controller 44 that controls the real current applied to the machine 60 that will follow the current signal. The current controller 44 is implemented as a proportional-integral (PI) controller in the rotor reference frame with the back-EMF decoupling terms. The current controller 44 outputs a voltage reference $v_{dq}^{r*}$.

The measured rotor position signal $\theta_r$ and the measured current signal $i_{dq}^s$ are in the stationary reference frame defined by the physical coordinates of the machine 60. The calculations in the control system 40 are performed in the rotor reference frame. Therefore, the measured rotor position signal $\theta_r$ and the measured current signal $i_{dq}^s$ are applied to a transformation block 46 that converts the measured current signal $i_{dq}^s$ to the rotor reference frame. The measured current signal $i_{dq}^r$ in the rotor reference frame is then sent to the command optimizer 42, the current controller 44 and a flux and inductance estimator process block 48. The flux and inductance estimator process block 48 generates a flux estimate $\hat{\lambda}_{dq}^r$ and a dynamic inductance estimate $L_{dd}, L_{qq}$ that are used by the command optimizer 42 to calculate equations (11) and (15). The current controller 44 also receives the flux estimate. The flux linkage information is crucial for the calculation of the current reference by either of the secant method and the Newton's method. Look-up tables can be used to obtain flux linkage information from the currents in the rotor reference frame.

The measured rotor position $\theta_r$ is applied to a speed observer process block 50 that estimates the rotor speed signal $\hat{\omega}_r$ from the rotor position signal $\theta_r$. The estimated speed is used to identify the operating region in the command optimizer block 42 and decouple the back-EMF in the current controller block 44.

The measured rotor position signal $\theta_r$ is also applied to a transformation block 52 that converts the voltage signal $v_{dq}^{r*}$ from the rotor reference frame to the stationary reference frame that is used to control the machine 60. The control system 40 also includes a limiter 54 that provides a physical limit to the voltage output $v_{dq}^s$ of the control system 40 so that the voltage limit of the machine 60 is not exceeded.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for calculating current control signals for controlling a machine, said machine being in a vehicle, said method comprising:
   determining an operating range of the machine based on the voltage limit of an inverter in the machine;
   calculating a current reference signal for controlling the torque of the machine based on the determined operating range, wherein calculating the current reference signal includes using one of a plurality of equations that optimize the current reference signal based on the determined operating range; and
   applying the current control signals to the machine based on the calculated current reference signal.

2. The method according to claim 1 wherein determining an operating range of the machine includes determining a first operating range of the machine at relatively low vehicle speeds and determining a second operating range of the machine at relatively high vehicle speeds, wherein the first operating range is controlled by a current limit and the second operating range is controlled by a voltage limit.

3. The method according to claim 2 wherein determining an operating range of the vehicle includes determining a third operating range of the machine at relatively high vehicle speeds, wherein the third operating range of the machine is controlled by the voltage limit and the machine being in an over-modulation operation.

4. The method according to claim 3 wherein calculating a current reference signal includes calculating a d-axis current reference signal and a q-axis current reference signal in a rotor reference frame, and calculating a current reference signal for the third operating range as:

$$\begin{bmatrix} i_d^{r*} \\ i_q^{r*} \end{bmatrix} = \begin{bmatrix} L_{ds} & 0 \\ 0 & L_{qs} \end{bmatrix}^{-1} \left\{ \begin{bmatrix} \frac{T_e^{*2}}{T_e^2} & 0 \\ 0 & \frac{T_e^*}{T_e} \end{bmatrix} \left( \begin{bmatrix} L_{ds} & 0 \\ 0 & L_{qs} \end{bmatrix} \begin{bmatrix} I_d^r \\ I_q^r \end{bmatrix} + \begin{bmatrix} \Lambda_m \\ 0 \end{bmatrix} \right) - \begin{bmatrix} \Lambda_m \\ 0 \end{bmatrix} \right\}$$

where $i_d^{r*}$ is the d-axis current reference signal, $i_q^{r*}$ is the q-axis current reference signal, $L_{ds}$ is the d-axis static inductance of the machine, $L_{qs}$ is the q-axis static inductance of the machine, $\Lambda_m$ is the permanent-magnet flux linkage and $I_d^r$ is the d-axis current signal, $I_q^r$ is the q-axis current reference signal to produce the maximum torque with linear voltage limit.

5. The method according to claim 2 wherein calculating a current reference signal includes calculating a d-axis current reference signal and a q-axis current reference signal in the rotor reference frame.

6. The method according to claim 5 wherein calculating a current reference signal includes calculating the current reference signal for the first operating range as:

$$\begin{bmatrix} i_d^{r*} \\ i_q^{r*} \end{bmatrix} \approx \begin{bmatrix} i_d^r \\ i_q^r \end{bmatrix} - \begin{bmatrix} \lambda_q^r & -\lambda_d^r \\ \lambda_d^r & \lambda_q^r \end{bmatrix}^{-1} \begin{bmatrix} f(i_d^r, i_q^r) \\ g(i_d^r, i_q^r) \end{bmatrix}$$

or $$\begin{bmatrix} i_d^{r*} \\ i_q^{r*} \end{bmatrix} \approx \begin{bmatrix} i_d^r \\ i_q^r \end{bmatrix} - \begin{bmatrix} \lambda_q^r - L_{dd} i_q^r & -\lambda_d^r + L_{qq} i_d^r \\ \lambda_d^r + (L_{dd} - 2L_{qq}) i_d^r & \lambda_q^r + (L_{qq} - 2L_{dd}) i_q^r \end{bmatrix}^{-1} \begin{bmatrix} f(i_d^r, i_q^r) \\ g(i_d^r, i_q^r) \end{bmatrix}$$

where $i_d^{r*}$ is the d-axis current reference signal, $i_q^{r*}$ is the q-axis current reference signal, $L_{dd}$ is the d-axis dynamic inductance of the machine, $L_{qq}$ is the q-axis dynamic inductance of the machine, $\lambda_d^r$ is the d-axis flux linkage, $\lambda_q^r$ is the q-axis flux linkage of the machine and $f$ and $g$ are non-linear functions.

7. The method according to claim 5 wherein calculating a current reference signal includes calculating the current reference signal for the second operating range as:

$$\begin{bmatrix} i_d^{r*} \\ i_q^{r*} \end{bmatrix} \approx \begin{bmatrix} i_d^r \\ i_q^r \end{bmatrix} - \begin{bmatrix} \lambda_q^r & -\lambda_d^r \\ \omega_r^2 L_{ds} \lambda_d^r & \omega_r^2 L_{qs} \lambda_q^r \end{bmatrix}^{-1} \begin{bmatrix} f(i_d^r, i_q^r) \\ g(i_d^r, i_q^r) \end{bmatrix}$$

or $$\begin{bmatrix} i_d^{r*} \\ i_q^{r*} \end{bmatrix} \approx \begin{bmatrix} i_d^r \\ i_q^r \end{bmatrix} - \begin{bmatrix} \lambda_q^r - L_{dd} i_q^r & -\lambda_d^r + L_{qq} i_d^r \\ \omega_r^2 L_{dd} \lambda_d^r - \omega_r R_s(\lambda_q^r - L_{dd} i_q^r) & \omega_r^2 L_{qq} \lambda_q^r + \omega_r R_s(\lambda_d^r - L_{qq} i_d^r) \end{bmatrix}^{-1} \begin{bmatrix} f(i_d^r, i_q^r) \\ g(i_d^r, i_q^r) \end{bmatrix}$$

where $i_d^{r*}$ is the d-axis current reference signal, $i_q^{r*}$ is the q-axis current reference signal, $L_{dd}$ is the d-axis dynamic inductance of the machine, $L_{qq}$ is the q-axis dynamic inductance of the machine, $\lambda_d^r$ is the d-axis flux linkage, $\lambda_q^r$ is the q-axis flux linkage of the machine and $f$ and $g$ are non-linear functions and $\omega_r$ is representative of the machine speed.

8. The method according to claim 5 wherein applying the current control signals to the machine includes using the calculated current reference signal for the first region if the voltage of the inverter has not exceeded a linear voltage limit.

9. The method according to claim 1 wherein calculating a current reference signal includes using a flux and inductance estimation of the machine for calculating the current reference signal.

10. The method according to claim 1 wherein calculating a current reference signal includes considering the saturation of the machine.

11. The method according to claim 1 wherein the machine is an interior permanent-magnet synchronous machine.

12. The method according to claim 11 wherein the machine includes a stator and a rotor, said stator including three coils receiving current signals and said rotor including a permanent magnet.

13. A system for calculating current control signals for controlling a machine, said machine being in a vehicle, said system comprising:

a command optimizer, said command optimizer determining an operating range of the machine based on the voltage of an inverter in the machine, said command optimizer calculating a current reference signal for controlling the torque of the machine based on its operating range, wherein calculating the current reference signal includes using one of a plurality of equations that optimize the current reference signal based on the determined operating range.

14. The system according to claim 13 further comprising a flux and inductance estimator, said flux and inductance estimator providing a machine flux and inductance signal to the command optimizer for calculating the current reference signal.

15. The system according to claim 13 further comprising a current controller for producing a voltage reference signal.

16. The system according to claim 13 wherein the command optimizer determines a first operating range of the machine at relatively low vehicle speeds and determines a second operating range of the machine at relatively high vehicle speeds, wherein the first operating range is controlled by a current limit and the second operating range is controlled by a voltage limit.

17. The system according to claim 16 wherein the command optimizer determines a third operating range of the machine at relatively high vehicle speeds, wherein the third operating range of the machine is controlled by the voltage limit and the machine being in an over-modulation operation.

18. The system according to claim 17 wherein the command optimizer calculates a d-axis current reference signal and a q-axis current reference signal in the rotor reference frame and calculates the current reference signal for the third operating range as:

$$\begin{bmatrix} i_d^{r*} \\ i_q^{r*} \end{bmatrix} = \begin{bmatrix} L_{ds} & 0 \\ 0 & L_{qs} \end{bmatrix}^{-1} \left\{ \begin{bmatrix} \frac{T_e^{*2}}{T_e^2} & 0 \\ 0 & \frac{T_e^*}{T_e} \end{bmatrix} \left( \begin{bmatrix} L_{ds} & 0 \\ 0 & L_{qs} \end{bmatrix} \begin{bmatrix} I_d^r \\ I_q^r \end{bmatrix} + \begin{bmatrix} \Lambda_m \\ 0 \end{bmatrix} \right) - \begin{bmatrix} \Lambda_m \\ 0 \end{bmatrix} \right\}$$

where $i_d^{r*}$ is the d-axis current reference signal, $i_q^{r*}$ is the q-axis current reference signal, $L_{ds}$ is the d-axis static inductance of the machine, $L_{qs}$ is the q-axis static inductance of the machine, $\Lambda_m$ is the permanent-magnet flux linkage and $I_d^r$ is the d-axis current signal, $I_q^r$ is the q-axis current reference signal to produce the maximum torque with linear voltage limit.

19. The system according to claim 16 wherein the command optimizer calculates a d-axis current reference signal and a q-axis current reference signal in the rotor reference frame.

20. The system according to claim 19 wherein the command optimizer calculates the current reference signal for the first operating range as:

$$\begin{bmatrix} i_d^{r*} \\ i_q^{r*} \end{bmatrix} \approx \begin{bmatrix} i_d^r \\ i_q^r \end{bmatrix} - \begin{bmatrix} \lambda_q^r & -\lambda_d^r \\ \lambda_d^r & \lambda_q^r \end{bmatrix}^{-1} \begin{bmatrix} f(i_d^r, i_q^r) \\ g(i_d^r, i_q^r) \end{bmatrix}$$

or $$\begin{bmatrix} i_d^{r*} \\ i_q^{r*} \end{bmatrix} \approx \begin{bmatrix} i_d^r \\ i_q^r \end{bmatrix} - \begin{bmatrix} \lambda_q^r - L_{dd} i_q^r & -\lambda_d^r + L_{qq} i_d^r \\ \lambda_d^r + (L_{dd} - 2L_{qq}) i_d^r & \lambda_q^r + (L_{qq} - 2L_{dd}) i_q^r \end{bmatrix}^{-1} \begin{bmatrix} f(i_d^r, i_q^r) \\ g(i_d^r, i_q^r) \end{bmatrix}$$

where $i_d^{r*}$ is the d-axis current reference signal, $i_q^{r*}$ is the q-axis current reference signal, $L_{dd}$ is the d-axis dynamic inductance of the machine, $L_{qq}$ is the q-axis dynamic inductance of the machine, $\lambda_d^r$ is the d-axis flux linkage, $\lambda_q^r$ is the q-axis flux linkage of the machine and $f$ and $g$ are non-linear functions.

21. The system according to claim 19 wherein the command optimizer calculates the current reference signal for the second operating range as:

$$\begin{bmatrix} i_d^{r*} \\ i_q^{r*} \end{bmatrix} \approx \begin{bmatrix} i_d^r \\ i_q^r \end{bmatrix} - \begin{bmatrix} \lambda_q^r & -\lambda_d^r \\ \omega_r^s L_{ds} \lambda_d^r & \omega_r^s L_{qs} \lambda_q^r \end{bmatrix}^{-1} \begin{bmatrix} f(i_d^r, i_q^r) \\ g(i_d^r, i_q^r) \end{bmatrix}$$

or $$\begin{bmatrix} i_d^{r*} \\ i_q^{r*} \end{bmatrix} \approx \begin{bmatrix} i_d^r \\ i_q^r \end{bmatrix} - \begin{bmatrix} \lambda_q^r - L_{dd} i_q^r & -\lambda_d^r + L_{qq} i_d^r \\ \omega_r^2 L_{dd} \lambda_d^r - \omega_r R_s (\lambda_q^r - L_{dd} i_q^r) & \omega_r^2 L_{qq} \lambda_q^r + \omega_r R_s (\lambda_d^r - L_{qq} i_d^r) \end{bmatrix}^{-1} \begin{bmatrix} f(i_d^r, i_q^r) \\ g(i_d^r, i_q^r) \end{bmatrix}$$

where $i_d^{r*}$ is the d-axis current reference signal, $i_q^{r*}$ is the q-axis current reference signal, $L_{dd}$ is the d-axis dynamic inductance of the machine, $L_{qq}$ is the q-axis dynamic inductance of the machine, $\lambda_d^r$ is the d-axis flux linkage, $\lambda_q^r$ is the q-axis flux linkage of the machine and $f$ and $g$ are non-linear functions and $\omega_r$ is representative of the machine speed.

* * * * *